US007933881B2

(12) United States Patent
Richey et al.

(10) Patent No.: US 7,933,881 B2
(45) Date of Patent: Apr. 26, 2011

(54) CONCURRENCY CONTROL WITHIN AN ENTERPRISE RESOURCE PLANNING SYSTEM

(75) Inventors: Jeffrey D. Richey, Woodinville, WA (US); Srikanth R. Avadhanam, Redmond, WA (US); Zhonghua Chu, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 225 days.

(21) Appl. No.: 11/378,890

(22) Filed: Mar. 17, 2006

(65) Prior Publication Data

US 2007/0219999 A1 Sep. 20, 2007

(51) Int. Cl.
*G06F 17/00* (2006.01)

(52) U.S. Cl. .......................................... 707/704; 726/21

(58) Field of Classification Search .................. 707/1, 2, 707/3, 8, 10, 203, 104.1, 704, 999.008, 999.201, 707/999.203, E17.007, E17.012; 709/104; 726/21

See application file for complete search history.

(56) References Cited

U.S. PATENT DOCUMENTS

| 5,263,156 | A  |   | 11/1993 | Bowen et al. |
|-----------|----|---|---------|--------------|
| 5,857,197 | A  |   | 1/1999  | Mullins |
| 5,920,857 | A  |   | 7/1999  | Rishe et al. |
| 6,125,371 | A  | * | 9/2000  | Bohannon et al. ............ 707/203 |
| 6,195,685 | B1 |   | 2/2001  | Mukherjee et al. |
| 6,240,413 | B1 |   | 5/2001  | Learmont |
| 6,249,803 | B1 | * | 6/2001  | Jindal et al. ................... 709/203 |
| 6,338,086 | B1 |   | 1/2002  | Curtis et al. |
| 6,363,387 | B1 |   | 3/2002  | Ponnekanti et al. |
| 6,665,678 | B2 |   | 12/2003 | Ching Chen et al. |
| 6,681,226 | B2 |   | 1/2004  | Bretl et al. |
| 6,928,582 | B2 | * | 8/2005  | Adl-Tabatabai et al. ......... 714/9 |
| 7,290,015 | B1 | * | 10/2007 | Singhal et al. ................ 707/202 |
| 2002/0138483 | A1 |   | 9/2002 | Bretl et al. |
| 2003/0058277 | A1 | * | 3/2003 | Bowman-Amuah .......... 345/765 |
| 2004/0015508 | A1 | * | 1/2004 | Anonsen ....................... 707/100 |
| 2004/0128328 | A1 |   | 7/2004 | Leff et al. |
| 2007/0118523 | A1 | * | 5/2007 | Bresch et al. ..................... 707/8 |

OTHER PUBLICATIONS

Herlihy, Maurice, "Apologizing Versus Asking Permission: Optimistic Concurrency Control for Abstract Data Types," *ACM Transactions on Database Systems*, vol. 15, No. 1, pp. 96-124 (Mar. 1990).

Hylton, Jeremy, "Avoiding Contention in an Optimistic (Zope) Object Database," [online], dated Oct. 31, 2003, 3 pages, retrieved from the Internet: <URL:http://www.python.org/~jeremy/weblog/031031c.html>.

Riviera, Jim, "Introducing BEA Weblogic Server 7.0," [online], dated Jan. 23, 2004, 8 pages, retrieved from the Internet: <URL:http://dev2dev.bea.com/pub/a/2004/01/318.html>.

"Pramati Server 3.0 Feature List," [online], [retrieved on Dec. 2, 2005], Retreived from the Internet: <URL:http://www.pramati.com/docstore/2001013/psv30features.htm>.

* cited by examiner

*Primary Examiner* — Charles Kim
*Assistant Examiner* — Anteneh Girma

(57) ABSTRACT

Concurrency control between multiple data transactions involving the same data includes comparing the version identifications which uniquely identify versions of the data during a read request and during a write request of a data transaction. An exception is thrown if the version identifications do not match, and the exception is handled within the data transaction.

20 Claims, 9 Drawing Sheets

CONCURRENCY CONTROL WITHIN AN ENTERPRISE RESOURCE PLANNING SYSTEM

BACKGROUND

Concurrency control within systems that allow multiple users simultaneous access to shared objects, data records, etc. is an important feature of any server-based product for managing shared data items. In particular, within enterprise resource planning systems there is often a need to support non-serializable cooperation among users having long-lived data transactions.

Generally, pessimistic concurrency control does not block other uses for read operations. For example, a repeatable read makes sure that the read row(s) is not updated, updated for the duration of the data transaction. However, in read operations with the intention of updating the read row, pessimistic concurrency control places an exclusive or update lock on a data item for the duration of a data transaction, thereby preventing other users from reading the data item with the intent to update. As a result, the other users must wait for the lock to be released before reading the data item with the intent to update, which impacts the concurrency and scalability of the system. In some cases, the scope of the lock applies to the entire database, an entire table within the database or several rows within a table rather than just the single row containing the data item being read or updated. As a result, the scope of the lock prevents multiple simultaneous users from reading or updating data items within different rows and/or tables. Further, within balanced tree data structures, queries, such as SQL queries, are unable to start the scan at a precise location. As part of the query execution, rows are scanned and filters are applied during the evaluation of the query. As a result, simultaneous readers prevent each other from reading the data items even when their final query results do not intersect. Although an application may select rows and apply filters to discard selected rows based on the filter criteria, the locks that are acquired on the selected rows continue to exist for the duration of the data transaction. Thus, concurrent tasks may become serialized for long-lived data transactions involving shared tables, even when there is no intersection within the final set resulting from the query.

Optimistic concurrency control allows a user to read, update and delete a data item without preventing other users from doing the same. Optimistic concurrency control assumes that the probability of updating or deleting the same data item during a write operation is small, and read operations are unrestricted. However, in the event that multiple data transactions are updating the same data item during a write operation, updates may be lost and only last update is maintained between the concurrent users, thereby causing data inconsistency. In other words, a first user may ultimately update a data item within a row of the table based on the originally retrieved values which were subsequently changed by a concurrent user. As a result, the update is based on stale data.

SUMMARY

The concurrency control between multiple data transactions involving the same data, provides a manner in which an exception generated from the concurrency control is handled within a data transaction rather than immediately aborting the data transaction. Exceptions may be handled by re-reading and re-trying updates to the data, thereby delaying a data transaction abort. The concurrency control further provides options between optimistic concurrency control and pessimistic concurrency control while accounting for relative updates and inter-table dependencies. Broadly, during a data transaction involving a write request from an application, a version identification which uniquely identifies a version of the data to be updated is compared to a version identification which identifies a version of the data when the data was previously read during the same data transaction. If the version identifications do not match, an exception is thrown and handled within the data transaction. The use of the concurrency control techniques is expected to de-serialize data transactions, ensure data consistency, and enable high scalability even if the data transactions are long-lived.

DETAILED DESCRIPTION

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts in accordance to the present invention, further discussion of such software and ICs, if any, will be limited to the essentials with respect to the principles and concepts of the preferred embodiments.

Figure 1:
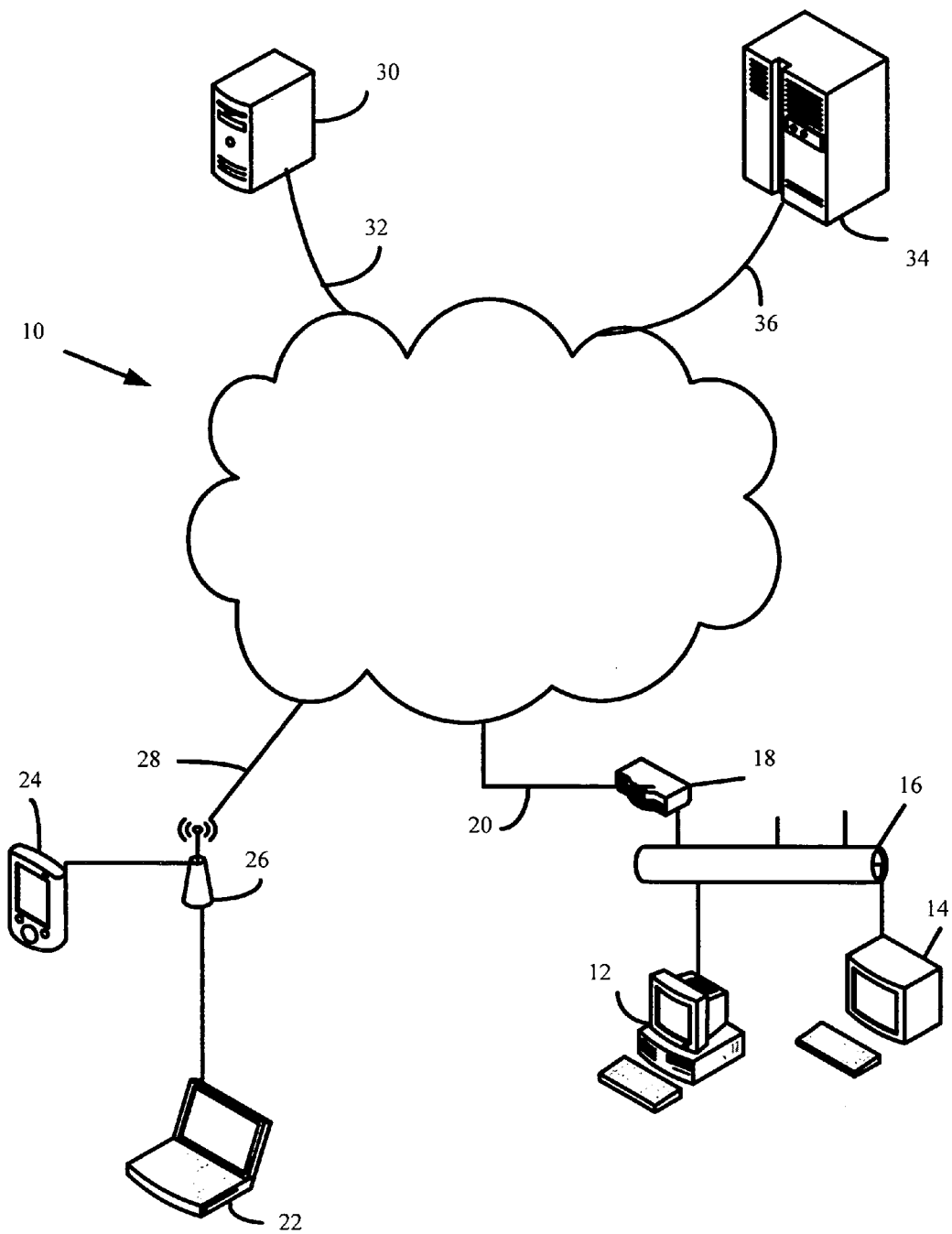
FIG. 1 is a simplified and representative block diagram of a computer network.
Figure 2:
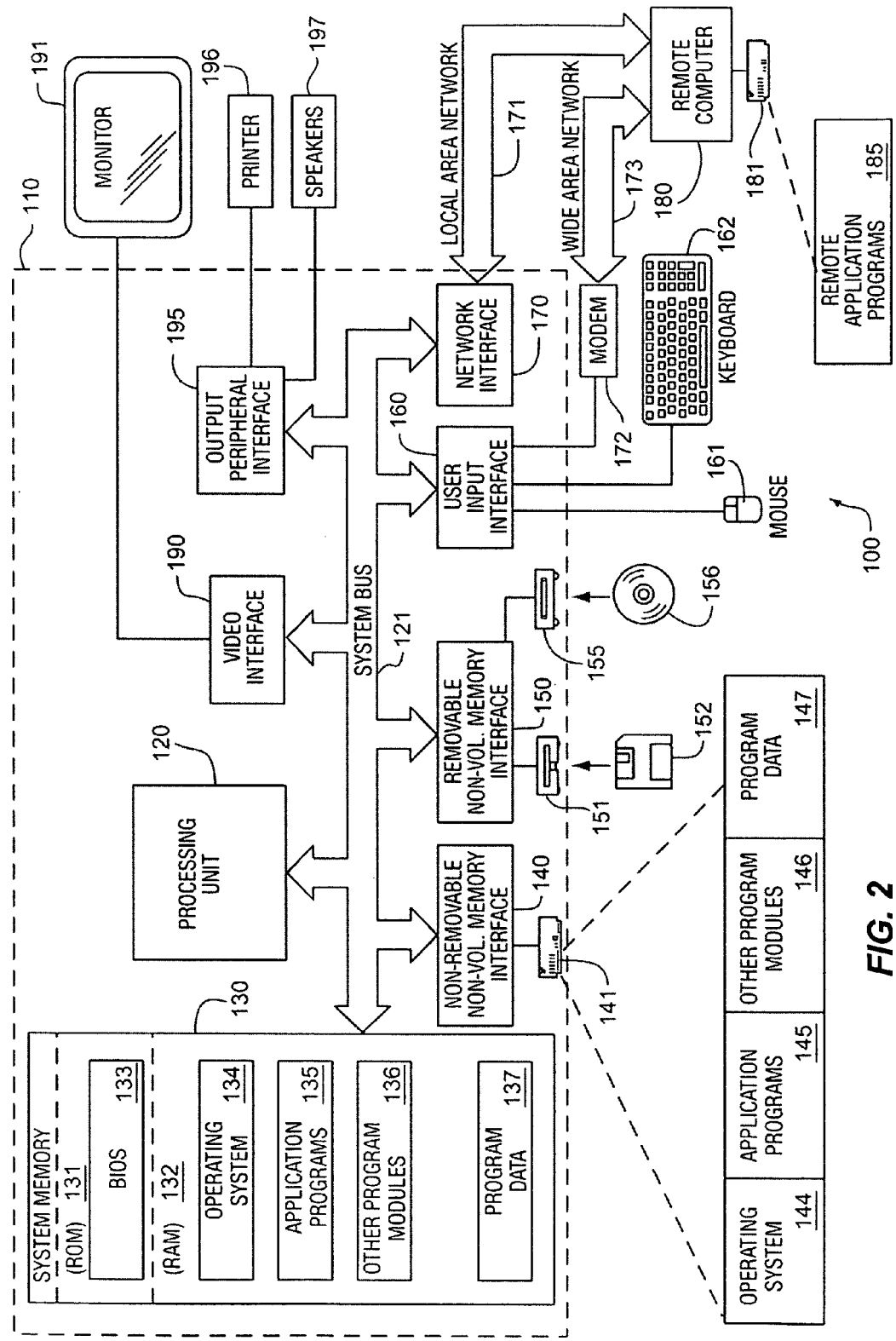
FIG. 2 is a block diagram of a computer that may be connected to the network of FIG. 1.

FIGS. 1 and 2 provide a structural basis for the network and computational platforms related to the instant disclosure.

FIG. 1 illustrates a network 10. The network 10 may be the Internet, a virtual private network (VPN), or any other network that allows one or more computers, communication devices, databases, etc., to be communicatively connected to each other. The network 10 may be connected to a personal computer 12, and a computer terminal 14 via an Ethernet 16 and a router 18, and a landline 20. The Ethernet 16 may be a subnet of a larger Internet Protocol network. Other networked resources, such as projectors or printers (not depicted), may also be supported via the Ethernet 16 or another data network. On the other hand, the network 10 may be wirelessly connected to a laptop computer 22 and a personal data assistant 24 via a wireless communication station 26 and a wireless link 28. Similarly, a server 30 may be connected to the network 10 using a communication link 32 and a mainframe 34 may be connected to the network 10 using another communication link 36. The network 10 may be useful for supporting peer-to-peer network traffic.

FIG. 2 illustrates a computing device in the form of a computer 110. Components of the computer 110 may include, but are not limited to a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, FLASH memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137.

The computer 110 may also include other removable/non-removable, volatile/nonvolatile computer storage media. By way of example only, FIG. 2 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2, provide storage of computer readable instructions, data structures, program modules and other data for the computer 110. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and cursor control device 161, commonly referred to as a mouse, trackball or touch pad. A camera 163, such as web camera (webcam), may capture and input pictures of an environment associated with the computer 110, such as providing pictures of users. The webcam 163 may capture pictures on demand, for example, when instructed by a user, or may take pictures periodically under the control of the computer 110. Other input devices (not shown) may include a microphone, joystick, game pad, satellite dish, scanner, or the like. These and other input devices are often connected to the processing unit 120 through an input interface 160 that is coupled to the system bus, but may be connected by other interface and bus structures, such as a parallel port, game port or a universal serial bus (USB). A monitor 191 or other type of display device is also connected to the system bus 121 via an interface, such as a graphics controller 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 2. The logical connections depicted in FIG. 2 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the input interface 160, or other appropriate mechanism. In a networked environment, program modules depicted relative to the computer 110, or portions thereof, may be stored in the remote memory storage device. By way of example, and not limitation, FIG. 2 illustrates remote application programs 185 as residing on memory device 181.

The communications connections 170 172 allow the device to communicate with other devices. The communications connections 170 172 are an example of communication media. The communication media typically embodies computer readable instructions, data structures, program modules or other data in a modulated data signal such as a carrier wave or other transport mechanism and includes any information delivery media. A "modulated data signal" may be a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Computer readable media may include both storage media and communication media.

Figure 3:
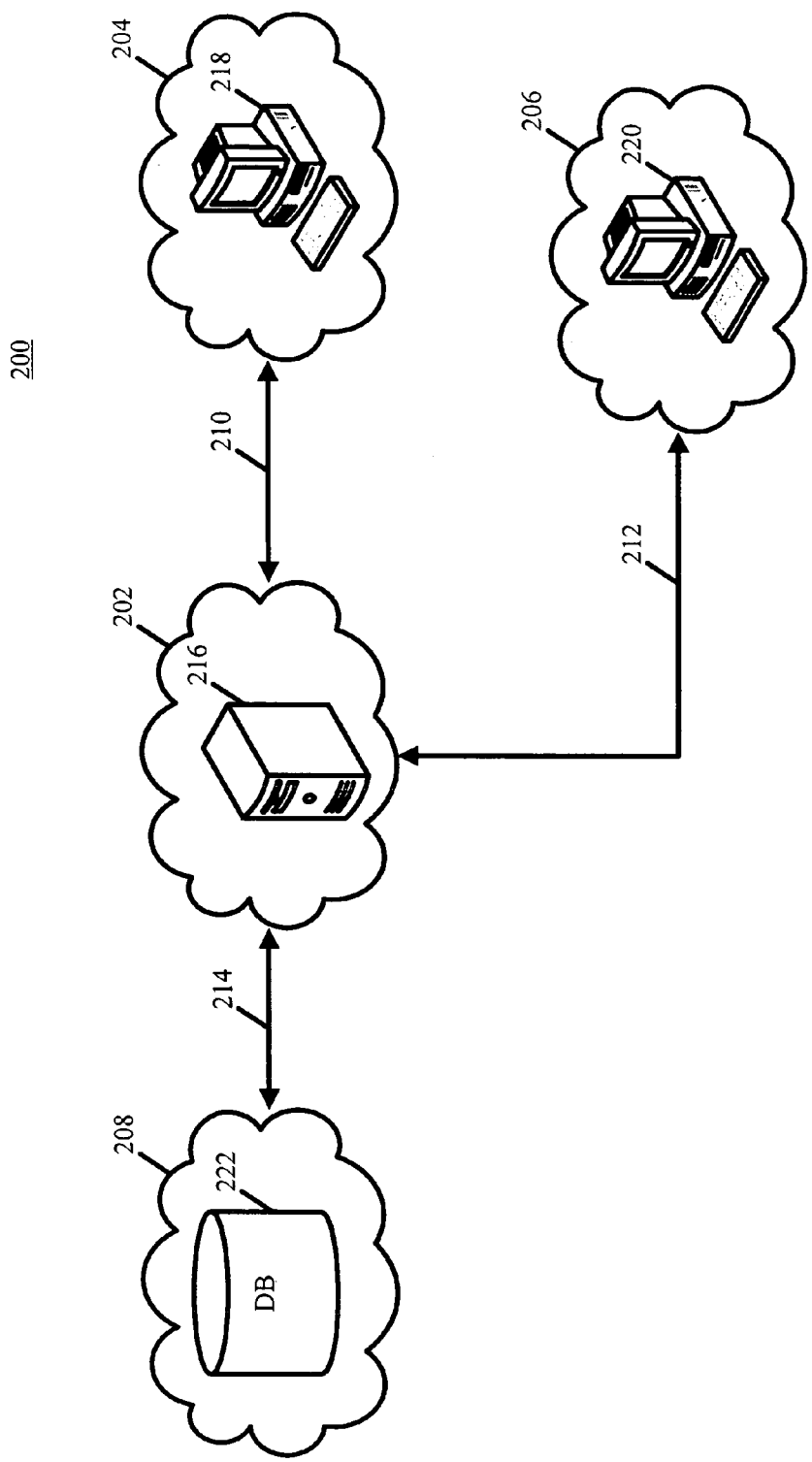
FIG. 3 is a representative block diagram of a system for managing concurrency control.

FIG. 3 may depict an exemplary client/server network 200, such as an enterprise resource planning system, that may be similar to or coupled to the network 10 of FIG. 1. A client/server network 200 may include individual systems 202, 204, 206, 208 coupled by networks 210, 212, 214. The networks 210, 212, 214 may be wired or wireless and may support Internet protocol version 6 (IPv6) and secure communications protocol, such as secured sockets layer (SSL). In one example, the Internet may be utilized as the networks 210, 212, 214. System 202 is a server system which may include one server 216 or multiple servers. The server system 202 may be a business enterprise server system, an SQL or other database management server system, or a messaging and enterprise collaboration server system, though different server types or server utilizations may be included.

Systems 204, 206 are client systems that each include a network communication device 218, 220, including, but not limited to, a personal computer, telephone, a personal digital assistant, a set-top box, television, and entertainment system, and the like. System 208 includes a database 222 operatively coupled to the server system 202, and which stores data items. In one example, the database 222 may store a data item within a row of a table, and the database 222 may maintain multiple tables to store data. The data items may be managed by the server system 202, which are stored in various tables having one or more rows corresponding to different data items. In one example, the network communication devices 218, 220 may relate to different users that may engage in read and/or write operations with the server 216 to access and/or modify a data item stored within the database 222. Generally, the server system 202 enables multiple simultaneous users 204, 206 to read or update data items within the database 222, data items within the same table or the same data item using the concurrency control techniques described herein. In a further example, using the above system 200, the server 216 may enable multiple clients 204, 206 to engage a server application managed by the server system 202. Alternatively, the clients 204, 206, may execute the applications locally. The application may include application code that includes read and/or update statements for providing read and/or write requests. As used herein, the term 'update' is hereby defined to mean any modification to the data item, including, but not limited to, modifying data, writing new data or deleting data.

Although the client systems 204, 206 are each shown to include one network communication device 218, 220, they should be understood that different numbers of network communication devices may be utilized. Likewise, the server system 202 may include different numbers of servers, and the database system 208 may include different numbers of databases. Further, while the server 216, the network communication devices 218, 220 and the database 222 are each shown to be provided within their own systems 202, 204, 206, 208, it should be understood that the server 216, the network communication devices 218, 220 and the database 222 may be provided within the same system. It should also be understood that multiple systems may be provided, including hundreds or thousands of client systems and database systems. Although the following disclosure generally describes multiple data transactions performing concurrent write operations on the same data item which may include the interaction between one server 216 and multiple simultaneous users or applications, it should be understood that one or more servers may operate simultaneously, each with one or more concurrent users or applications performing data transactions for executing write operations on one or more data items. In addition, while the following disclosure generally describes the concurrency control techniques being implemented within a kernel data access layer of the server system operating system, it should be understood that various other implementations of the concurrency control techniques may be utilized. Various examples of computer code are provided below, some of which are written in X++ programming language, which is a simple object-oriented language, or C++ programming code, although various other programming languages, including other object-oriented languages, may be utilized.

Generally, during a data transaction involving a read operation the server system 202 receives a read request from an application, such as a business process, being executed by a user. Using the concurrency control techniques described herein, the server system 202 may allow unrestricted read operations of data items by concurrent users, because merely reading a data item does not cause a loss of integrity. As such, applications are allowed to read rows and corresponding data items without acquiring exclusive locks on the read operation, thereby allowing for maximum concurrency within the server system 202. In addition, read operations with the intention of updating data may also be performed without acquiring exclusive locks, thereby exposing the read operation to reading uncommitted data. As described further herein, data integrity may be maintained by comparing version identifications of the affected data during updates.

On the other hand, during data transactions involving a write operation, the server system 202 may ensure data consistency to avoid lost updates. The data operations may be handled in three phases: a read phase, a validation phase and a write phase which actually performs the write operation. In one example, the server system 202 may handle the read phase, and the database 222 may handle the validation and write phases. Each write request is preceded by a read request. The write requests may be handled by receiving the initial read request, selecting the data item and providing the result to the application, when the data is being fetched from the database for subsequent updating. The application then modifies the data item and provides the update to the server system 202 or to the database 222. An update lock may be initiated on the row corresponding to the data item, the data item may be selected, and the data item being updated may be validated. During validation, a consistency checking algorithm may be triggered which determines whether the data item was updated during another data transaction by comparing version identifications, also referred to herein as "RecVersion," of the data item as initially read and of the data item being updated. In other words, it may be determined whether the version of the data item being updated is same as the version of the data item that was initially read. If the versions are the same, the update is allowed to proceed, the changes are submitted to the database 222 and the row corresponding to the data is unlocked once the data transaction is committed. If the versions are different, the server system 202 detects the conflict and raises an update conflict exception and the application is provided with an opportunity to handle the conflict to attempt to compensate for the update conflict within the data transaction without automatically rolling back or aborting the data transaction. If the application is unable to compensate for the update conflict, the server system 202 rolls back the data transaction. The application may be aware of the exception and may roll back the application code to a place were the application can attempt the write operation later. The server system 202 thereby provides concurrency control during a write operation without locking the row corresponding to the data item when the data item is fetched from the database for subsequent updating. Instead, row-level locking is utilized during the actual update, thereby allowing other data transactions to read the data item or update any other data item within the table and/or the database 222. If the data item is modified by another data transaction between the fetch and the update, the modification is detected, and an exception is generated, handled and may be thrown from the kernel data access layer to the application code.

Optimistic and Pessimistic Concurrency Control Management

In addition to providing optimistic concurrency control, the server system 202 may further maintain a pessimistic concurrency control option. Accordingly, the server system 202 may be provided with a variety of concurrency control options, including, but not limited to, globally enabling optimistic concurrency control, globally disabling optimistic concurrency control, and the enabling optimistic concurrency control for each table. Globally enabling optimistic concurrency control enables the kernel to conduct the data transactions under optimistic concurrency control for all tables within the database 222. Globally disabling optimistic concurrency control instructs the kernel to conduct the data transactions under pessimistic concurrency control for all tables within the database 222. By enabling optimistic concurrency control for each table, individual tables within the database 222 are configured to operate under a specific concurrency control method. For example, all tables may be initially set to have optimistic concurrency control enabled, and users may change this value on a table-by-table basis, as appropriate.

A global optimistic concurrency control switch may be provided to switch between enabling and disabling the global optimistic concurrency control, and enabling or disabling, optimistic concurrency control for each table. The global optimistic concurrency control switch may be provided as a set flag stored within the database 222 that switches between the various options for concurrency control support. The server system 202 may check the status of the global optimistic concurrency control switch when the server system 202 is activated, and the global settings are fetched and stored in memory. When the client is activated, the session call passes back the switch values to the client which sets the values locally. The per table optimistic concurrency control is added to the table property set at runtime and rendered on the application object tree property for tables. The per table optimistic concurrency control may use an unused bit of a flag within the metadata storage, may define the default value with a bit "0" in which case the per table optimistic concurrency control property is set to "true."

In some cases, an application may need an exception from the configurations described above. For example, optimistic concurrency control may need to be disabled at a statement level for individual applications, even though a particular table is set with optimistic concurrency control enabled for most other applications. Thus, the kernel may introduce key words, such as "pessimisticlock" and "optimisticlock" described below, within the programming language to override the per table and global optimistic concurrency control switches. The following sample of pseudo-computer code implementation illustrates an example of pessimistic concurrency control management at the statement level, where optimistic concurrency control is globally enabled (or enabled at the table level), but a particular application requires a pessimistic lock:

```
...
{
    CustTable custTable;
    ;
    ttsbegin;
        select pessimisticlock CustTable where
        CustTable.Currency == 'CAD';
        CustTable.PriceGroup = 'PUB';
        CustTable.update( );
    ttscommit;
}
```

The keyword "pessimisticlock" allows the kernel to not retrieve the version identification "RecVersion," which identifies the version of the data item being updated, thereby overriding the optimistic concurrency control and allowing the data item to be read with the necessary update locks in place, according to pessimistic concurrency control.

The following sample of pseudo-computer code implementation illustrates an alternative example of optimistic concurrency control management at the statement level, where optimistic concurrency control is globally disabled (or disabled at the table level), but a particular application requires an optimistic lock:

```
...
{
    CustTable custTable;
    ;
    ttsbegin;
        select optimisticlock CustTable where
        CustTable.Currency == 'CAD';
        CustTable.PriceGroup = 'PUB';
        CustTable.update( );
    ttscommit;
}
```

Version Identification

As previously indicated, each data item is associated with a version identification ("RecVersion"). Each table within the database 222 that utilizes optimistic concurrency control includes a column relating to the version identification. When creating a table in the database 222, the kernel data access layer adds the version identification column to the table definition. In the event that tables already exist within the database 222 without a version identification column, a version identification column may be added to the existing tables and the server system 202 may automatically generate version identification values for all rows in the table. When a record is inserted into a table having the version identification column, the server system 202 may automatically generate a new version identification value for the new record. For all write operations using optimistic concurrency control, the kernel data access layer reads the version identification values for all rows being fetched and stores the version identification values for subsequently checking the consistency of the data items to detect update conflicts. When updating a data item within a row, the kernel data access layer retrieves the version identification value for that row when it was initially fetched from the database 222 and adds it to an update statement predicate. If the update statement predicate does not find a matching version identification value, an update conflict is detected and an update conflict exception is raised to the application which attempts to handle the conflict. If the write operation involves deleting a record that was previously read, the kernel data access layer adds the version identification value to the statement predicates to determine whether the record being deleted has been previously modified.

New version identification values generated for updated data may be maintained in the kernel data access in order to maintain the transaction semantics across multiple data operations. As a result, the new version identification values may be generated in the server system 202, rather than the database 222.

In one example, the version identification may be a server timestamp that uniquely identifies the data item. In another example, the version identification may simply be an incrementing integer. However, in deserializing data transactions in order to maximize the number of concurrent data transactions that may occur, read uncommitted isolation levels may be utilized, which allows data items to be selected and updated by a data transaction both within and outside of another data transaction. Generally, an isolation level refers to the degree to which the transaction must be isolated from other transactions. However, in order to increase concurrency read uncommitted isolation levels are used to take advantage of the possibility that not all data transactions always require full isolation. As a result, data correctness may be compromised without an appropriate version identification. With either of the above version identification examples, the possibility exists that an update by a previous data transaction may not be correctly detected, thus resulting in overwriting, as illustrated by the chart below:

| Time | Transaction 1 | Transaction 2 | Transaction 3 | RecVersion of row r of table t in database. |
|---|---|---|---|---|
| T1 | Ttsbegin; Select forupdate; RecVersion in memory = v; | | | V (commited) |
| T2 | Update; RecVersion in memory = v + 1; | | | V + 1 (not commited) |
| T3 | | Ttsbegin; Select forupdate; RecVersion in memory = V + 1 | | |
| T4 | Abort; | | | V (commited) |
| T5 | | | Ttbbegin; Select forupdate; RecVersion in memory = v; | V (commited) |
| T6 | | | Update; Commit; Commit succeeds as RecVersions match; | V + 1 (commited) |
| T7 | | Update; Commit; Commit succeeds as RecVersions match; This may overwrite changes made by transaction 3 at T6. | | V + 1 (commited) |

As illustrated above, a first data transaction may read an initial version identification value V and update the data item thereby causing the version identification value to be updated to V+1. Prior to committing the write operation, the first data transaction may abort the write operation, and the version identification value is reset to V. However, a second data transaction begins a write operation before the abort and reads the version identification value V+1. A third data transaction begins a write operation after the abort, stores the version identification value V in memory and commits the write operation before the second data transaction commits its write operation. Consequently, the third data transaction also updates the version identification value to V+1, because the version identification value V stored in memory matches the version identification value V of the data item being updated. When the second data transaction commits its write operation, the version identification value V+1 stored in memory matches the version identification value V+1 of the data item being updated. Accordingly, the second data transaction assumes it is updating the data item based on the first data transaction's aborted update, and effectively overwrites an update by the third data transaction.

In order to address this possibility, the version identification may be provided as a random number that uniquely identifies the data item across all server allocations. In one example, the seed for the random number may be based upon the content of the data item itself, thereby ensuring that the random number is unique to the data item across time, users and the server system 202, and each version of the data item following an update has a unique version identification value associated with it. In another example, the seed for the random number is a random seed used to generate the random number with a random generation algothithm.

The generation of the random number may utilize a cryptographic application program interface, CryptGenRandom. The CryptGenRandom function fills a buffer with cryptographically random bytes that are more random than usual random classes. The measure of uncertainty (i.e., entropy) may be generated for the CryptGenRandom function from one or more of the following sources: thread in kernel switches, current process identifier, ticks since boot, current time, memory information and object store statistics. The CryptGenRandom function may be initialized once through a static method. An example of the initialization of the CryptGenRandom function is shown below. CRYPT_NEWKEYSET|CRYPT_MACHINE_KEYSET are used so keys for services can be access. While C++ style notation is used to describe the initialization, the initialization is not limited thereto.

```
HCRYPTPROV dbRecbuf::dbrb_hCryptProv = dbRecbuf::InitHCryptProv( );
HCRYPTPROV dbRecbuf::InitHCryptProv( )
{
if(!CryptAcquireContext(&(dbrb_hCryptProv),NULL,NULL,PROV_RSA_FULL,
CRYPT_MACHINE_KEYSET))
        {
          DWORD dwError = GetLastError( );
          AXTRACE("hCryptProv first try acquire context failed with %d",
dwError);
          //if(NTE_BAD_KEY == dwError)
          {
        if(!CryptAcquireContext(&(dbrb_hCryptProv),NULL,NULL,PROV_RSA_
FULL, CRYPT_NEWKEYSET |CRYPT_MACHINE_KEYSET))
          {
            dwError = GetLastError( );
            AXTRACE("hCryptProv second try acquire context failed with
%d", dwError);
            _ASSERT(FALSE);
          }
        }
      }
      else
      {
        _ASSERT(FALSE);
      }
    }
    _ASSERT( NULL != dbrb_hCryptProv);
    AXTRACE("hCryptProv initialized to %d", dbrb_hCryptProv);
    return dbrb_hCryptProv;
}
```

Further, a method may be added to use the CryptGenRandom to generate the next version identification, RecVersion, to ensure that the function generates a positive version identification. A new version identification value may be generated for each successful update of a data item where the data transaction has been committed. An example of this function is shown below:

```
int dbRecbuf::SetNextRecVersion( )
{
  int iReturnCode = CQL_OK;
  boolean fRetry = true;
  while(fRetry)
  {
    fRetry = false;
```

-continued

```
    if(CryptGenRandom(dbrb_hCryptProv, sizeof(this-
>dbrb_iRecVersion), (byte*)(&this->dbrb_iRecVersion)))
    {
      if(this->dbrb_iRecVersion < 0)
      {
        this->dbrb_iRecVersion = - this->dbrb_iRecVersion;
      }
      else if(0 == this->dbrb_iRecVersion)
      {
        fRetry = true;
      }
    }
    else
    {
      iReturnCode = CQL_EXCEPTION;
    }
  }
  return iReturnCode;
}
```

Disabling Pessimistic Locking

As previously mentioned, an option may be provided between pessimistic concurrency control and optimistic concurrency control, for example via the global optimistic concurrency control switches. However, when updating a data item, the application code of the application may include triggers within update statements that automatically enable pessimistic locking by default. For example, in X++ programming code, pessimistic locking may be triggered by a forupdate hint within SELECT and WHILE SELECT statements, and applications using a forupdate hint may work on the assumption that the server system 202 platform supports pessimistic locking.

In order to disable the pessimistic locking but maintain backwards compatibility with applications that assume pessimistic locking, the optimistic concurrency control may remove, ignore or reinterpret the trigger in the update statements to disable pessimistic locking during optimistic concurrency control. For example, the trigger may be reinterpreted in the context of the per statement, per table and global optimistic concurrency control switches. More specifically, the trigger may not cause an update lock to be held in the database. Instead, the trigger may specify the intention of the application. For example, the trigger may specify whether the intention is a merely a read operation or whether the intention is to use the read operation for a future update. Based on the switches, the kernel data access layer may decide whether the update lock should be held (pessimistic) or if the version identification of the row should be fetched (optimistic). In another example, within X++ programming, the database hint to acquire a database update lock is removed from the SELECT and WHILE SELECT statements without changing the application code for pessimistic locking. An example of disabling pessimistic locking is shown below by removing the database hint from SELECT and WHILE SELECT statements:

```
SomeFunction
{
   ...
   ttsbegin;
   While select table1 forupdate where table1.somePredicate = someValue
   {
      ...
      If(CheckCondition(table1)
      {
         ComputeNewValue(table1);
         table1.update( );
      }
   }
   ttscommit;
}
```

Figure 4:
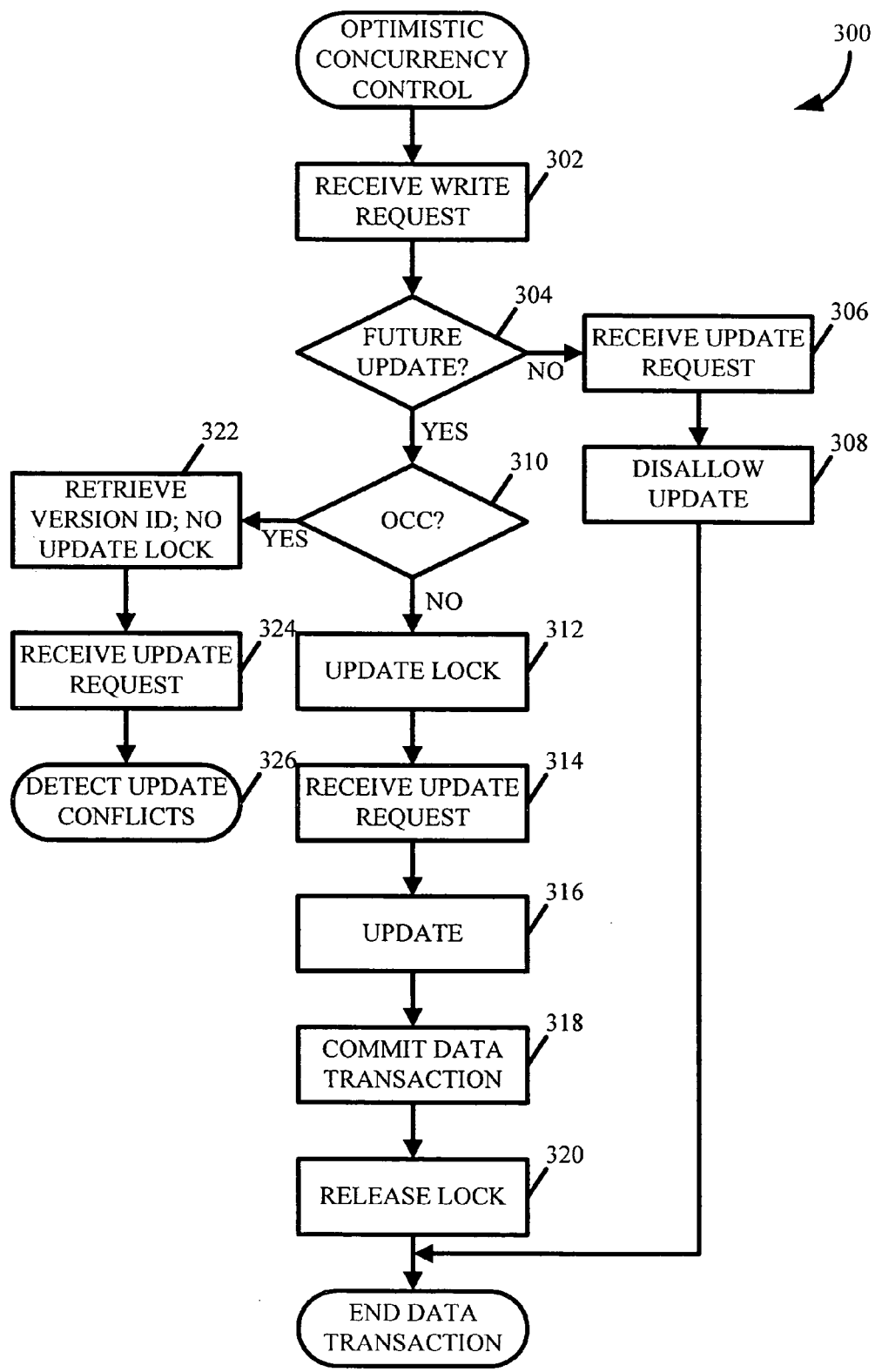
FIG. 4 is a flowchart representative of a routine for optimistic concurrency control.

FIG. 4 is an example of an optimistic concurrency control routine 300 which may be executed by the server system 202, and in particular by the kernel data access layer of the kernel of the server system 202, to disable pessimistic locking during a write operation to update a data item within the table, where optimistic concurrency control has been enabled for a table (either globally or on a per table basis). As previously indicated, each write request is preceded by a read request. Whatever data items are read in the optimistic concurrency control mode, the kernel data access layer reads the version identification values for all the corresponding rows it fetches and stores them future use, such as when an update is executed on the data items of the fetched rows. Following a read request, no locks are held until a write request to update a data item is called. In the optimistic concurrency control techniques described herein, when updating a data item (i.e., a row within the table) the kernel data access layer retrieves the version identification value for the corresponding row that was fetched from the database during the read operation, and adds the version identification value to the update statement predicates in order to see if the data item has been modified.

If the update involves deleting a data item that was previously read, the kernel data access layer adds the version identification value to the update statement predicates to see if the data item being deleted has been modified. The kernel data access layer requests the database 222 to check to see if any other data transaction has changed the data item being updated after it was read. If an update conflict is detected, an UpdateConflict exception is thrown. As will be described further below, rather than immediately aborting the data transaction when the UpdateConflict exception is thrown, the exception may be handled within the data transaction.

Referring to FIG. 4, beginning at block 302, the optimistic concurrency control routine 300 receives a read request from an application during a data transaction. If the read request does not relate to a read operation with the intention of updating the row such as "forupdate," "pessimisticlock," or "optimistic lock," as determined at block 304, any subsequent update requests received at block 306 may be disallowed at block 308 and the transaction may be terminated. If the read request relates to a read operation with the intention of updating the row, the routine 300 may determine whether optimistic concurrency control should be applied, such as by determining if optimistic concurrency control has been enabled for the table at block 310. The routine 300 further determines at block 310 whether the version identification will be retrieved and used for the update.

In order to determine whether optimistic concurrency control is needed as determined at block 310, the kernel data access layer may be provided with a centralized repository for looking up calculations on whether optimistic concurrency control should be applied and whether the version identification should be retrieved. Such calculations may be performed only once on a data object, such as a data item, a row, a table or the like. In one example, such a determination may be implemented by a schema which checks to see if a version identification for a row needs to be checked using RecVersion for update and delete. The version identification check may not be needed or may not be used in one or more of the following situations: when RecVersion is not read, for a row set operation, if the table or a row is specifically marked as requiring a column comparison which is described further below, or if the update is a relative update which is also described further below. The following is an example of such a schema, SqlStmt::IsRecVersionCheckNeededForupdate, which checks to see if the RecVersion check is to be used for an update and which further requires that optimistic concurrency control be enabled for the table. A "TRUE" value is returned if the RecVersion check is to be used.

```
boolean SqlStmt::IsRecVersionCheckNeededForupdate( )
{
   // _ASSERT( type_update == this->get_stmt_type( ) || type_delete == this-
>get_stmt_type( ));
      if(!m_fRecVersionCheckNeededForupdateCalculated)
      {
         m_fRecVersionCheckNeededForupdate = cqlParentCursor( )-
>IsRecVersionNeededForSelect( );
         m_fRecVersionCheckNeededForupdate =
m_fRecVersionCheckNeededForupdate && !(this->update_rowset( ) || this-
>sqldelete( ));
         m_fRecVersionCheckNeededForupdate =
m_fRecVersionCheckNeededForupdate && ! cqlParentCursor( )->IsRereadNeeded( );
            if(m_fRecVersionCheckNeededForupdate && this->updateList( ))
            {
               m_fRecVersionCheckNeededForupdate =! this-
>GetIsRelativeUpdate( );
            }
         m_fRecVersionCheckNeededForupdateCalculated = TRUE;
      }
```

-continued

```
        return m__fRecVersionCheckNeededForupdate;
    }
```

Alternatively, or in conjunction with the SqlStmt::IsRecVersionCheckNeededForupdate schema, the determination at block 312 may further be implemented by a schema which checks to see if any form of update conflict detection is to be used. For example, update conflict detection is used if the version identification is needed for the update or if a reread for the update is specified. A reread flag means that the data was originally fetched onto forms and optimistic concurrency control should be used regardless of other settings. If optimistic concurrency control is disabled, then update conflict detection may be used for forms only. Forms, and also reports, use queries for fetching data, where a data source is attached to the query object and an update property determines whether the query is allowed to update data items in the database. On the other hand, if optimistic concurrency control is enabled, then update conflict detection may use the version identification or column comparison. The following is an example of such a schema, SqlStmt::IsUpdateConflictDetectionNeededForupdate, which checks to see if any form of update conflict detection, such as RecVersion check or column comparison, is to be used for the update. A "TRUE" value is returned if any form of update conflict detection is to be used.

```
    boolean SqlStmt::IsUpdateConflictDetectionNeededForupdate( )
    {
        boolean fUpdateConflictDetectionNeededForupdate = FALSE;
        if(g__fDisableOcc || getTable(cqlParentCursor( )->dataset( ))-
>IsOccDisabled( ))
        {
            fUpdateConflictDetectionNeededForupdate = cqlParentCursor( )-
>rereadOnUpdate( );
        }
        else
        {
            {
                fUpdateConflictDetectionNeededForupdate = this-
>IsRecVersionCheckNeededForupdate( )
                    || cqlParentCursor( )->IsRereadNeeded( );
            }
            else
            {
                fUpdateConflictDetectionNeededForupdate = this->cqlParentCursor( )-
>rereadOnUpdate( );
            }
        }
        return fUpdateConflictDetectionNeededForupdate;
    }
```

Referring again to block 310 of FIG. 4, if optimistic concurrency control is not to be utilized during the update, which may be determined using the example schema provided above, the version identification is not retrieved and the update lock is held in the database against the row being updated at block 312. At block 314, the update request may be received, and at block 316 the actual writing and/or update of the data item is performed, which may include writing new data to the row, deleting the data item or the like. The data transaction is committed at block 318 and the update lock is released at block 320. If optimistic concurrency control is turned on for the table and is to be utilized during the update as determined at block 310, the version identification is retrieved from the database at block 322, the update request is received at block 324 and the version identification is used for update conflict detection utilizing a detect update conflicts routine 326. It is noted that no update lock is implemented and held against the database at block 322.

Detect Update Conflicts

Figure 5:
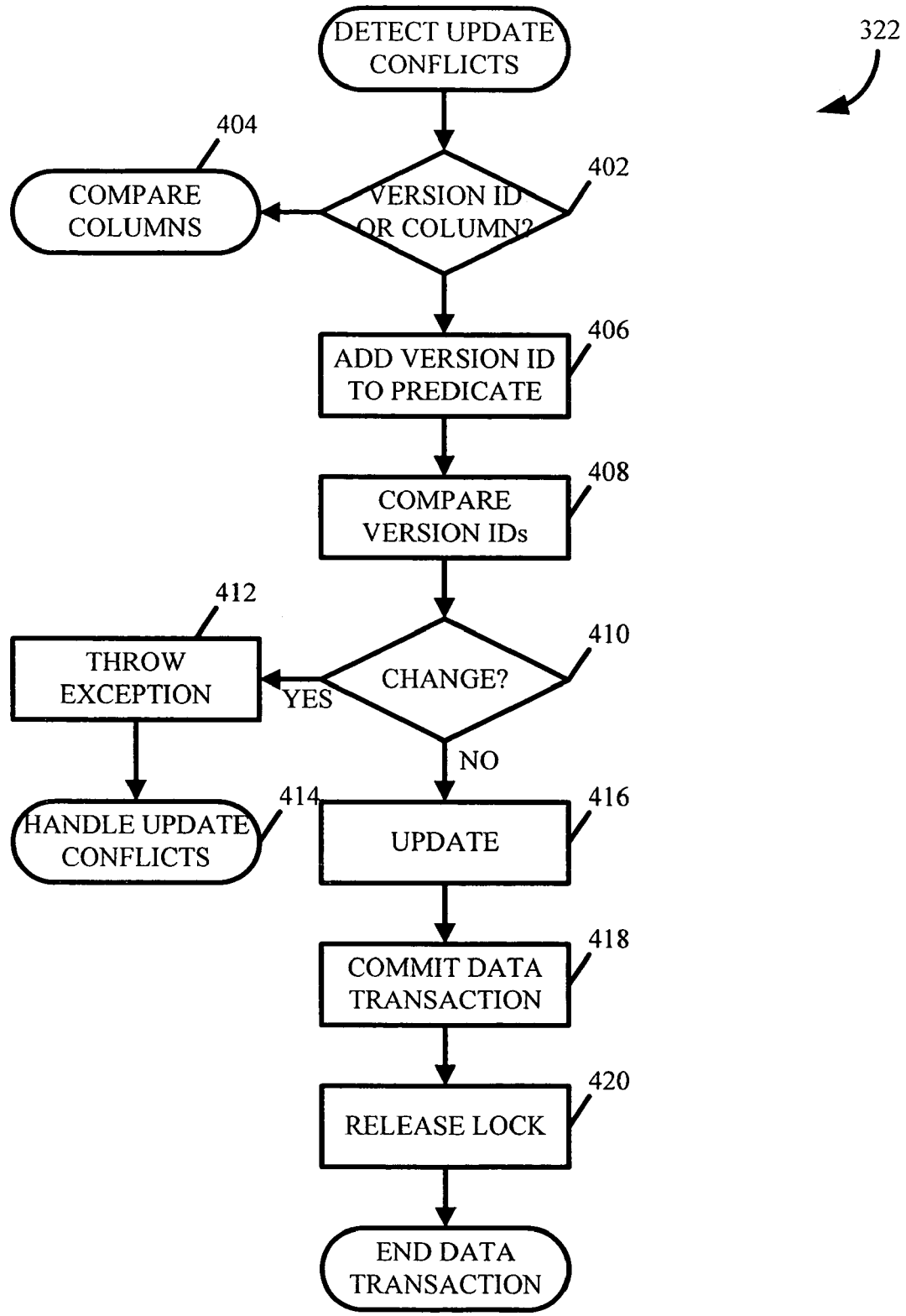
FIG. 5 is a flowchart representative of a routine for detecting update conflicts within the optimistic concurrency control routine of FIG. 4.

FIG. 5 is an example of a detect update conflicts routine 326 which may be executed by the server system 202, and in particular by the kernel data access layer of the server system 202, to detect whether or not any conflicts have occurred in updating the data item. In other words, the detect update conflicts routine 326 may determine whether or not the data item was changed by another data transaction between the initial fetch of the data item and the update. The detect update conflicts routine 326 may detect any such changes and throw an exception from the kernel data access layer to the application code.

Beginning at block 402, the detect update conflicts routine 326 may initially check to see if there is a need to perform either a version identification check (RecVersion check) or a column comparison. For example, column comparison may be used if the application is merely modifying an existing data item. Column comparison may be used for backward compatibility or as application logic may dictate. On the other hand, a version identification check may be used for all forms of update, such as modifying data or deleting a data item. The following is an example of a schema, SqlStmt::AddOccExpressionNodes, which first checks to see if either a version identification check or a column comparison is needed (for example, if the row was locked upon read, there is no need for either) and then switches to use either version identification or column comparison, if needed. The resulting expression nodes, BuildUpdateConflictDetectionExpressionNode for performing a column comparison and BuildRecVersonExpressionNode for performing a version identification check, are returned if any form of update conflict detection is to be used.

```
    exprNode * SqlStmt::AddOccExpressionNodes(exprNode *
originalExpressionNode) // I original expresion node.
        {
            _ASSERT(this->get_stmt_type( ) == type_update || this->get_stmt_type( )
== type_delete);
            if(this->IsUpdateConflictDetectionNeededForupdate( ))
            {
                exprNode * pxprndNewWhere = NULL;
                // Inline update conflict should only be done for update.
                if( this->cqlParentCursor( )->GetDetectUpdateConflictInStatement( ))
                {
                    if(this->get_stmt_type( ) == type_update )
                    {
                        pxprndNewWhere =
BuildUpdateConflictDetectionExpressionNode( );
                        _ASSERT(NULL != pxprndNewWhere);
                    }
                }
                else
                {
                    pxprndNewWhere = BuildRecVersonExpressionNode( );
                    _ASSERT(NULL != pxprndNewWhere);
                }
                originalExpressionNode =
AndExpressionNodes(originalExpressionNode,pxprndNewWhere);
                _ASSERT(NULL != originalExpressionNode);
            }
            return originalExpressionNode;
        }
```

Referring back to FIG. 5, if a column comparison is to be performed, as determined at block 402, the routine 326 may proceed to compare columns at block 404. In particular, server system 202 may request the database to perform a comparison. In one example, the update statement utilizing column comparison may look like the following:

Update table1 set field1=new field1Value where RecID=myRecID and field1=field1OldValue The following is an example of a schema, SqlStmt::BuildUpdateConflictDetectionExpressionNode, which builds and returns an expression note for detecting an update conflict utilizing column comparison. In particular, it is noted that a version identification is not used in this particular example of update conflict detection.

```
        exprNode * SqlStmt::BuildUpdateConflictDetectionExpressionNode( )
        {
            _ASSERT( NULL != this->updateList( ) );
            _ASSERT( NULL != ip( ));
            exprNode * pxprndNewWhere = NULL;
            exprNode * pxprndWhere = NULL;
            CQL_EVAL_ELEM * pcqlvlOriginalValue = NULL;
            valueNode * pvlndOriginalValueNode = NULL;
            for ( baseList<assignmentNode*>::iterator assgnmntndAssignmentNode =
updateList( )->begin( );
                assgnmntndAssignmentNode != updateList( )->end( );
                assgnmntndAssignmentNode++ )
            {
                if( DBFIELD_RECVERSION ==
DBFHDL_EXT2DBFHDL((*assgnmntndAssignmentNode)->GetLeftNode( )-
>getField(ip( ))))
                {
                    continue;
                }
                pcqlvlOriginalValue = new CQL_EVAL_ELEM(
                    (*assgnmntndAssignmentNode)->GetLeftNode( )->getField(ip( )),
                    cqlParentCursor( )->orig_buffer( ));
                pvlndOriginalValueNode = new valueNode(pcqlvlOriginalValue);
                _ASSERT((*assgnmntndAssignmentNode)->GetLeftNode( )->isField( ));
                fieldExpr * pfldxprField = new
fieldExpr((*assgnmntndAssignmentNode)->GetLeftNode( )->getField(ip( )),
                    cqlParentCursor( ));
                pxprndNewWhere = new
eqNode(pfldxprField,pvlndOriginalValueNode);
                pxprndWhere = AndExpressionNodes(pxprndWhere,pxprndNewWhere);
            }
            _ASSERT( NULL != pxprndWhere);
            return pxprndWhere;
        }
```

If the routine 326 determines that a version identification check is to be performed, the version identification is added to the update statement predicate at block 406 to determine if the data item has been modified between the fetch and the update. At block 408, the version identification of the fetched data item is retrieved and compared to the version identification of the data item to be updated. It is noted that if the version identification comparison is to be performed by the database 222, the server system 222 does not need to fetch the version identification on behalf of the database 222. Because the version identifications are unique to the version of the data item, any difference between the version identification of the fetched data item and the version identification of the data item being updated, as detected at block 410, causes an exception to be thrown at block 412. In one example, the exception may be thrown from the kernel data access layer to the application code that generated the update statement. At block 412, a structured exception routine may be performed as described further below, and the update conflict exception may be handled by a routine at block 414.

On the other hand, if there is no difference in the version identifications, as determined at block 410, the actual update of the data item is performed at block 416, which may include writing new data to the data item, deleting the data item or the like. After the data is updated at block 416, a write lock (also referred to as an exclusive lock) is held. At block 418 the data transaction is committed and the write lock is released at block 420.

Structured Exceptions

Figure 6:
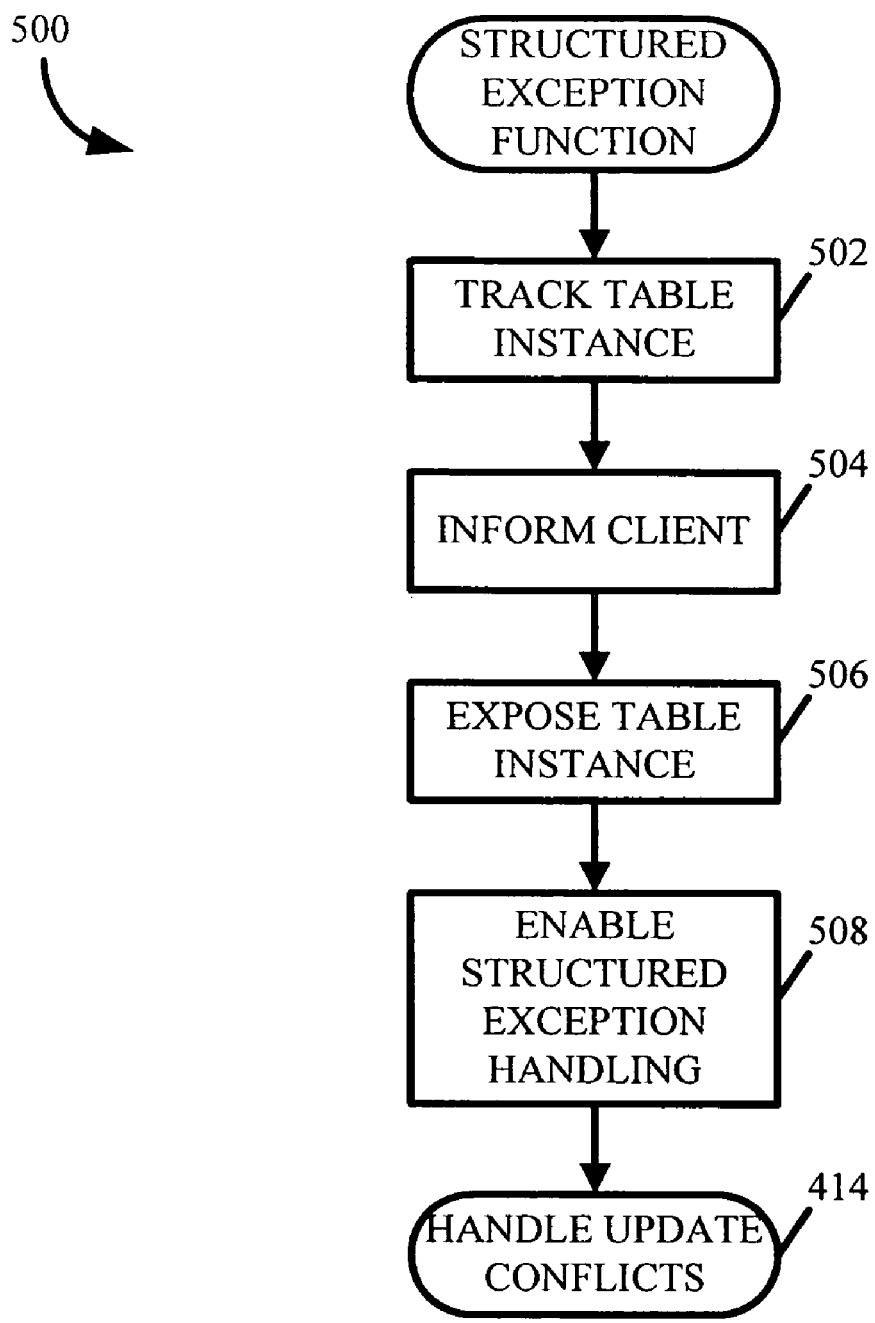
FIG. 6 is a flowchart representative of a routine for a structured exception thrown during the detecting update conflicts routine of FIG. 5.

FIG. 6 is an example of a structured exception routine 500 which may be executed at block 322 whenever an update conflict exception is thrown. In particular, the structured exception routine 500 demonstrates an example of runtime support for structured exception handling. As previously indicated, at runtime an update conflict error is detected by the kernel data access layer and an update conflict exception is thrown. A structured exception handling construct may catch an update conflict, wherein the catch lock is executed only when the update conflict happens on the table specified in the construct. By comparison, in an unstructured exception handling construct, the catch block may be executed whenever there is an update conflict exception inside a try block.

Beginning at block 502, the data access kernel may track the table instance where the update conflict exception occurred. The kernel may maintain a kernel representation of the table instance in which the update conflict occurred. In C++ programming language the representation may be referred to as the cqlCursor. In X++ programming language the representation may be any variable that represents a table. In particular, the kernel may put the kernel representation, cqlCursor, in a table property, which may be referred to as the LastUpdateConflictingTable property, so that the kernel knows which table has incurred the update conflict exception. In one example, this function may be performed with the following schema, cqlDatasourceSql::RaiseUpdateConflitError, an example of which is provided below, which raises a specific error indicating an update conflict and returns an integer indicating the error code specifying the update conflict exception.

```
int cqlDatasourceSql::RaiseUpdateConflictError(
    int iDBError,    // I DB error code
    interpret * pintprtInterpret) // I pointer to interpreter.
{
    __ASSERTE(NULL != pintprtInterpret);
#if defined(DEBUG)
    //Log it.
    eventlog-
```

-continued

```
>logEvent(EVLOG_WARNING,EVMSG_MSG,_T("Update/Delete
conflict detected!"),_T("OCC"));
#endif
    if( x__uiUpdateConflictException !=
pintprtInterpret->isp.exceptionval )
    {
        pintprtInterpret->isp.exceptionval =
        x__uiUpdateConflictException;
        pintprtInterpret->SetLastUpdateConflictingTable(cursor( ));
    }
    //__ASSERTE(x__uiUpdateConflictException ==
pintprtInterpret->isp.exceptionval );
    return raiseErr(iDBError, cursor( )-
>exceptionFailureReason(DB_OPR_RECORD_CHANGED),
pintprtInterpret);
    //int iReturncode = raiseErr(iDBError, cursor( )-
>exceptionFailureReason(DB_OPR_RECORD_CHANGED),
pintprtInterpret);
    int iReturncode = ::raiseErr(this->dataset( ),iDBError, cursor( )-
>exceptionFailureReason(DB_OPR_RECORD_CHANGED),
pintprtInterpret, x__uiUpdateConflictException);
    //pintprtInterpret->isp.exceptionval =
    x__uiUpdateConflictException;
    return iReturncode;
}
```

A block 504, the routine 500 informs the user or client of the update conflict exception. In particular, the routine 500 sets the table property, LastUpdateConflictingTable, across the server/client call in order to set the table property properly on the client side whenever the call is made across the server/client boundary. The client maintains a local table property. As such, any table that has incurred an UpdateConflict exception should have a local reference on the client side for the table. Thus, whenever the server system 202 is about to return the call to the client, it checks to see if there is an Update-Conflict exception, and sends the reference back to the client. The client sees that there is an UpdateConflict exception, reads the reference, looks the reference up locally and interprets the reference. In particular, the client may check the exception type and the local reference, de-reference it and set the reference on the table property.

At block 506, the structured exception routine 500 exposes the table instance that has incurred the UpdateConflict exception. For example, the LastUpdateConflictingTable property may be exposed to the application code on the application class. At block 508, a run-time function enables the structured exception handling. For example, a byte code may be used as an index to a function pointer table. The function may be added to the interpret class and maps to the byte code to process the structured exception for the update conflict. At runtime, the function is called and checks both the exception type and the table on which the update conflict occurred. The function then sets the next instruction to the catch block only when they both match. Control then may pass to the handle update conflicts routine 414.

Handling Update Conflict Exceptions

Figure 7:
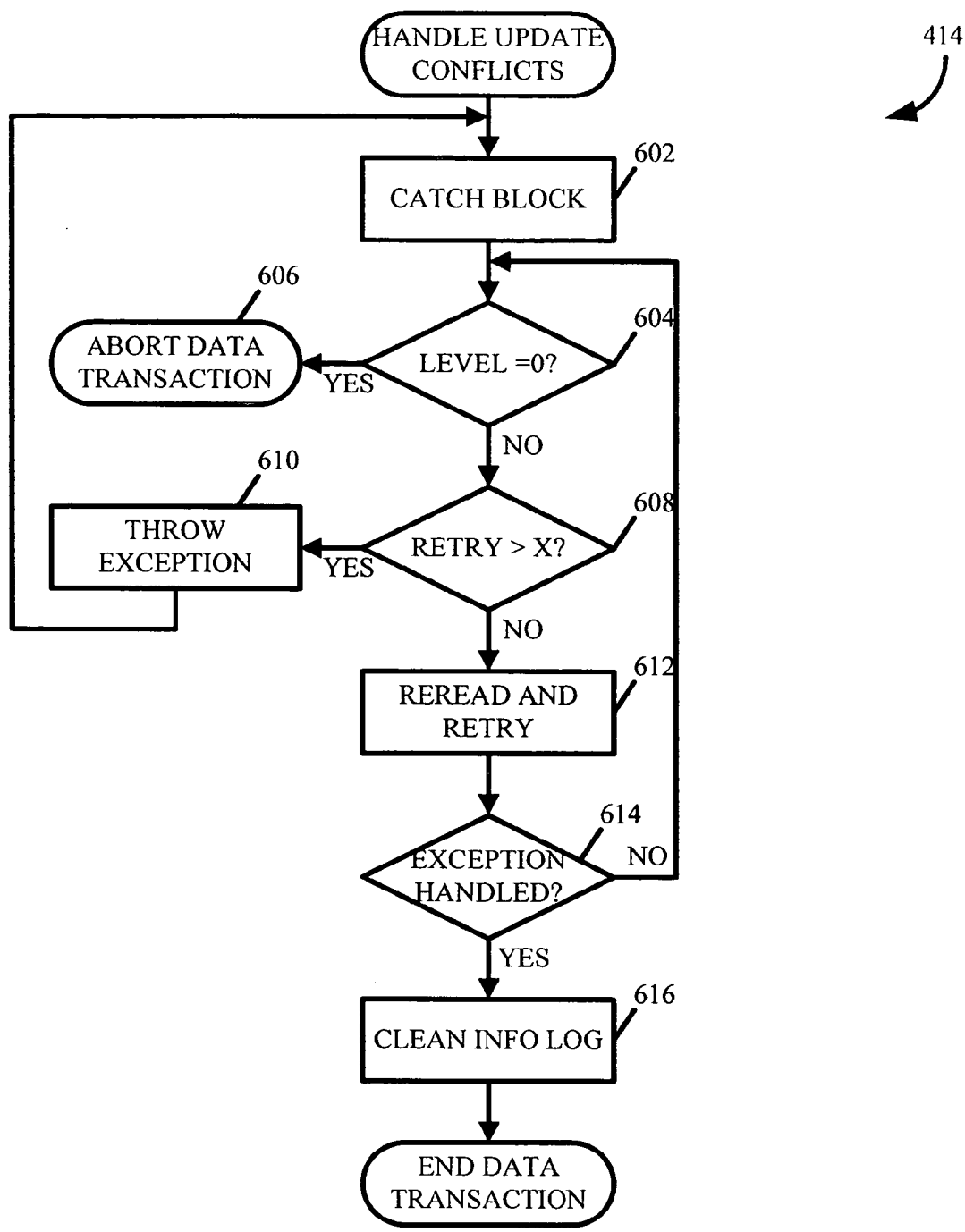
FIG. 7 is a flowchart representative of a routine for handling an exception during a data transaction if an exception is thrown during the detecting update conflicts routine of FIG. 5.

FIG. 7 is an example of a handle update conflicts routine 414 shown schematically in FIGS. 5 and 6, and which may be executed to handle any UpdateConflict exceptions which may occur during the detect update conflict routine 322. In particular, and as indicated above, the handling of UpdateConflict exceptions may be performed within the data transaction rather than automatically aborting the data transaction when the exception occurs. The handle update conflicts routine 600 allows the application code to reread the data, reapply the update logic and attempt the update again. Although the handle update conflicts routine 414 described below is an exemplary depiction of compensating for an UpdateConflict exception, it should be understood that different forms of compensation logic may be utilized.

Generally, update statements are maintained within "try" blocks, such that any exception that occurs within a try block is captured within a "catch" block. In some cases, try blocks are nested within other try blocks thereby creating multiple try block levels. The handle update conflicts routine 414 enables the UpdateConflict exception to be handled within the data transaction and delays aborting the data transaction by attempting to reread and retry the data transaction within a catch block of each try block level, before moving the handling execution back to the next try block level and recapturing the UpdateConflict exception within another catch block. The application code may perform this whenever the conflict exception is caught and handled. More specifically, application may make sure that the data in the database and the objects state in the memory are in a consistent state. The data transaction may only be aborted once the outermost try block level is reached and the corresponding catch block has been executed or the transaction level has reached "0."

In order to implement the routine 414, the try block level may be tracked by incrementing and decrementing a try level count, tryLevelCount, as the data transaction enters and leaves each try block. The try level count may be shared by the server system 202 with the client. A sample pseudo-computer code implementation for tracking the try block level as a data transaction enters and leaves a try block may be as follows:

```
S_Word interpret::xal_try_sym( )
{
    ... ... ...
    this->EnterTryBlock( );
    ... ... ...
    rc = evalLoop( );
    this->LeaveTryBlock( );
    ... ... ...
    return rc;
}
```

In addition to nested try block levels, in some cases the application code may be wrapped within other application code. As a result, a data transaction may be nested within other data transactions. In order to gracefully handle the compensation logic of the handle update conflicts routine 414, the UpdateConflict exception may simply be thrown to the outermost data transaction because the entire data transaction has been rolled back. A sample pseudo-computer code implementation for allowing the outermost is transaction to handle the UpdateConflict exception may be as follows:

```
...
...
    try
    {
        ttsbegin;
            this.updateNow( )
        ttscommit;
    }
    catch(Exception::Deadlock)
{
    retry;
}
catch(Exception::UpdateConflict)
{
    // may be the business logic requires a try here
    if (appl.ttslevel( ) == 0)
        retry;
    else
        throw Exception::UpdateConflict;
}
..
```

As seen in the above example, nested try blocks are supported. Rather than aborting the data transaction when an update conflict occurred, nested ttsbegin and ttscommit block may cause the nesting level to increase without starting or committing new data transactions. Rather it is included as part of an outer transaction. Transactions are started and committed by the outmost nesting level but can be aborted anywhere in the nesting. If an update conflict is raised inside a try block, the nesting level of the transaction is resorted to that when the code enters the try block. The transaction is aborted if this level is 0. An update conflict may be raised which may be caught using a structured exception handling construct where the catch block is executed only when the conflict happens on the table specified, or may be caught using a unstructured exception handling construct where the catch block is executed whenever an conflict occurs inside the try block. A mechanism that the application code may use to find out which table incurred the conflict.

Referring again to FIG. 7, beginning at block 602 once the UpdateConflict exception has been thrown the data transaction enters a catch block. At block 604, the handle update conflicts routine 414 determines whether or not the data transaction is within a try block by checking the try level counter. For example, if the try level count has a value of zero, the data transaction is no longer within a try block and may be aborted at block 606. If the data transaction is within the try block, the application code can attempt a reread and a retry of the data transaction. In particular, the catch block may attempt a predetermined number of rereads and retries before throwing the exception back to the next try block level. Thus, at block 608, the handle update conflicts routine 414 determines whether the number of retries has exceeded a predetermined limit. If so, the routine 414 throws the exception back to the next try block level at block 610.

On the other hand, if the number of retries has not exceeded the predetermined level, the routine 414 made reread the row and retry the data transaction within the catch block at block 612 without rolling back or immediately aborting the data transaction. If the UpdateConflict exception is successfully handled, as determined at block 614, a corresponding information log regarding the UpdateConflict exception may be cleared at block 616 and the data transaction may be committed. An UpdateConflict exception may be successfully handled, for example, by rereading the data from the database and retrying the update. In such a case, the update lock is not held in the database, but the application can choose to switch to pessimistic locking in the handling code, in which case the update lock is held through the read and updated to an exclusive lock after the update. If the UpdateConflict exception is not successfully handled, the retry count may be incremented by one and control may pass back to block 608.

A sample pseudo-computer code implementation for handling the UpdateConflict exception may be as follows. In the following example, the try catch level is one and no more than five retries are allowed.

```
static void OCC2_SimpleCompensationLogic(Args_args)
{
    CustTable custTable;
    int retryCount;
    ;
    ttsbegin;
        select forupdate custTable where
            custTable.AccountNum == 'S135' &&
        custTable.CustGroup == '00';
            retryCount = 0;
            try
            {
                custTable.CreditRating =
```

```
        strfmt("%1",str2int(custTable.CreditRating)+1);
                custTable.update( ); // The UpdateConflict will be
thrown inside this method. See below
                info(strfmt("CreditRating = %1",
                custTable.CreditRating));
            }
        catch (Exception::UpdateConflict)
            {
            if( retryCount < 4)
                {
                retryCount ++;
                custTable.reread( );
                retry;
                } else
                {
                throw Exception::UpdateConflictNotRecovered;
                }
            }
        ttscommit;
        }
```

A sample pseudo-computer code implementation for handling an UpdateConflict exception with multiple updates may be as follows. As demonstrated by the pseudo-computer code, the update conflict encountered by a first application results in the data transaction being aborted as dictated by the application code. On the other hand, the update conflict encountered by the second application results in a retry.

```
        static void Occ2Test_MultipleUpdateConflictMgmt(Args _args)
        {
            CustTable cust1;
            CustTable cust2;
            ;
            ttsbegin;
            try
            {
                select forupdate cust1 where cust1.AccountNum ==
'S135' && cust1.CustGroup == '00';
                select forupdate cust2 where cust2.AccountNum ==
'S136' &&
cust1.CustGroup == '00';
                cust1.CreditRating =
                strfmt("%1",str2int(cust1.CreditRating)+1);
                cust2.CreditRating =
                strfmt("%1",str2int(cust2.CreditRating)+1);
                cust2.update( );
                cust1.update( );
            }
            catch(Exception::UpdateConflict, cust1)
            {
                ttsabort;
                throw Exception::UpdateConflictNotRecovered;
            }
            catch(Exception::UpdateConflict, cust2)
            {
                cust2.reread( );
                cust2.CreditRating =
                strfmt("%1",str2int(cust2.CreditRating)+1);
                cust2.update( );
            }
            ttscommit;
        }
```

The pseudo-computer code example provided above for handling an UpdateConflict exception with multiple updates utilizes a structured exception handling mechanism. Alternatively, a sample pseudo-computer code for an unstructured handling of an UpdateConflict exception with multiple updates is provided below. Again, the first application aborts the data transaction, whereas the second application retries the data transaction.

```
        ..
        catch(Exception::UpdateConflict)
        {
            if(appl.LastUpdateConflictingTable( ) == cust1)
            {
                ttsabort;
                throw Exception::UpdateConflictNotRecovered;
            }
            else if(appl.LastUpdateConflictingTable( ) == cust2)
                {
                cust2.reread( );
                cust2.CreditRating =
                strfmt("%1",str2int(cust2.CreditRating)+1);
                cust2.update( );
                }
        }
        ..
```

Relative Update

As previously indicated, in some cases the update may relate to a relative update, in which case the version identification check is not utilized. Nonetheless, relative updates may be utilized in order to reduce update conflicts, and may be particularly useful for real and integer field types. If an update to a data item is relative, as opposed to absolute, the update is performed in the following form: update table1 set field1=field1+change, whereas an absolute update may be performed as follows: update table1 set field1=finalValue. For example, two simultaneous data transactions may each want to decrement a field value by "two" where the field has an initial value of "eight," as opposed to specifying a new value for the field. The relative update decrements causes the initial value to be decremented by two in response to the first data transaction, and decrements the new value by two again in response to the second data transaction to provide a final value of "four." An advantage of a relative update is that a relative update does not overwrite another user's change, even if the change happens between the read and the update, because the nature of the relative update format makes it resistant to another user's change. Accordingly, if all fields are updated using relative updates, the version identification check may be avoided. In order to implement relative updates, update fields may be marked as using relative updates.

Figure 8:
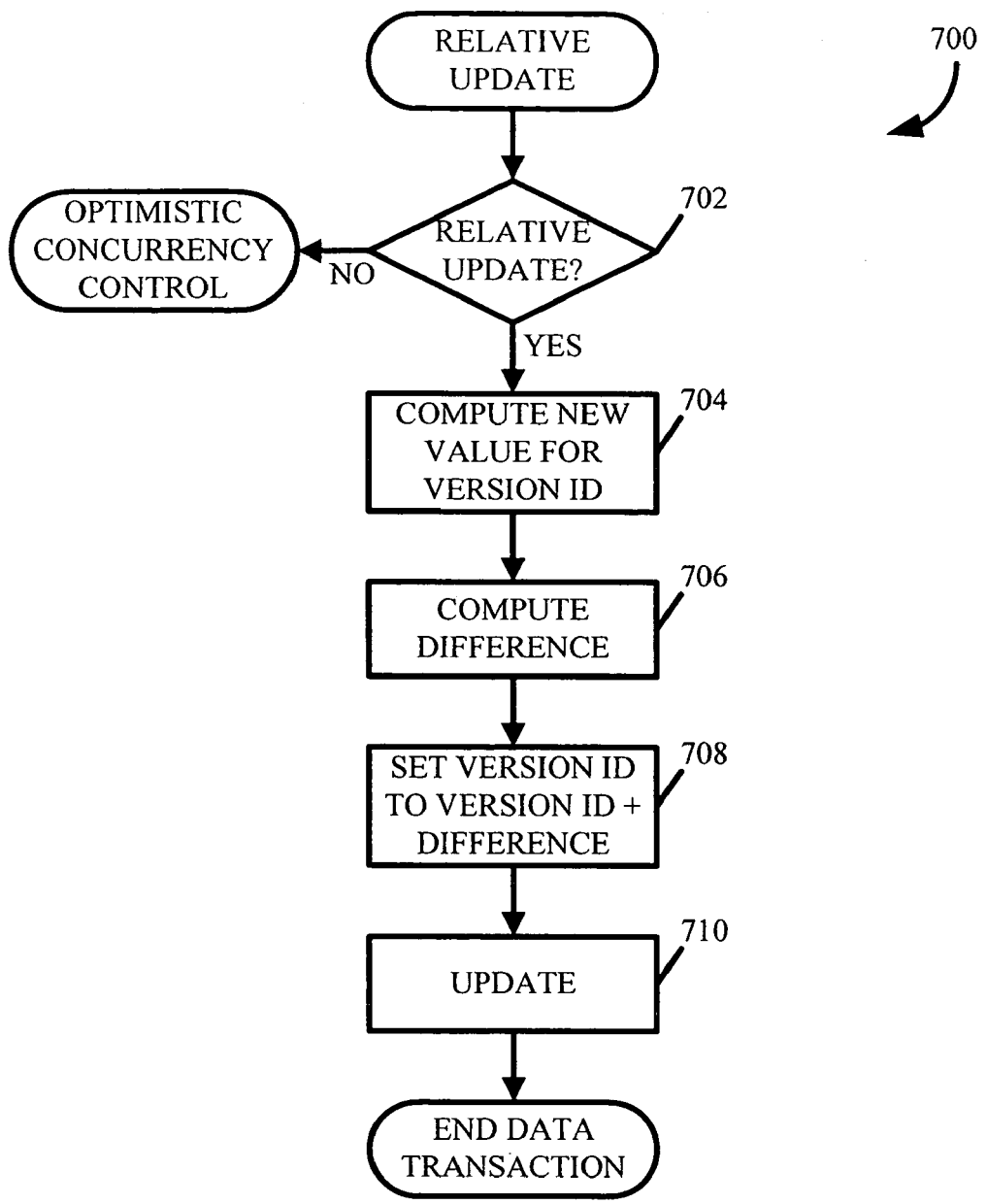
FIG. 8 is a flowchart representative of a routine for conducting a relative update of data.

FIG. 8 is an example of a relative update routine 700 which may be used to perform relative updates on the date item. Beginning at block 702, the relative update routine 700 determines whether or not the update statement calls for a relative update and/or whether or not the field being updated is marked as using relative updates. If the update is not a relative update, control may refer back to the optimistic concurrency control routine 300. A pseudo-computer code example is provided below for determining whether a relative update may the utilized. As mentioned, because version identifications are not utilized, fields associated with the version identification are ignored.

```
void SqlStmt::SetIsRelativeUpdate(boolean fIsRelativeUpdate)
{
    m_fIsRelativeUpdate = fIsRelativeUpdate;
    cqlParentCursor( )->
    SetIsRecVersionUpdateRelative(fIsRelativeUpdate);
    m_fIsRelativeUpdateCalculated = TRUE;
}
boolean SqlStmt::GetIsRelativeUpdate( )
{
```

```
    if(!m__fIsRelativeUpdateCalculated)
    {
      m__fIsRelativeUpdate = TRUE;
      for
        ( baseList<assignmentNode*>::iterator assgnmntndAssignmentNode
= updateList( )->begin( );
          assgnmntndAssignmentNode != updateList( )->end( );
          assgnmntndAssignmentNode++ )
      {
        __ASSERT((*assgnmntndAssignmentNode)->GetLeftNode( )-
>isField( ));
        DBFHDL__EXT fxtFieldHandle =
(*assgnmntndAssignmentNode)->getField(ip( ));
        if(!isSystemField(fxtFieldHandle))
        {
          hdlField* phdlfldField =
getField(cqlParentCursor( )->dataset( ),
DBFHDL__EXT2DBFHDL(fxtFieldHandle));
          __ASSERT(phdlfldField);
          if(!(phdlfldField->info( )->dbfflags & DBF__RELATIVE))
          {
            m__fIsRelativeUpdate = FALSE;
            break;
          }
        }
      }
      m__fIsRelativeUpdateCalculated = TRUE;
    }
    return m__fIsRelativeUpdate;
  }
```

Transaction semantics should be maintained where potentially multiple references to the same row in a table can be held and multiple operations can be performed on the multiple references. When an update is carried out, the version identifications on variables holding references to the same row being updated are updated as if they were read in the same transaction. In addition to the RecVersion column, two other columns may be added: TransactionRecVersiona and OriginalRecVersion, where a unique TransactionRecVersion is generated for each new transaction and when the first update inside this transaction touches a row, the TransactionRecVersion is updated using the new one just generated and the old RecVersion is assigned to the OrignalRecVersion. An update is allowed to go through if the TransactionRecVersion matches that of the current transaction and the OriginalRecVersion matches the RecVersion in memory (which means the transaction owns the row) or if the RecVersion matches the RecVersion in memory. Whenever an update is made, the RecVersion may be updated.

As with any update, the routine 700 may update the value identification for the updated field. However, because the relative update routine 700 does not check the value identification, the possibility exists that the update may overwrite another data transactions update if the value identification is updated with new value using the techniques described above, as illustrated by the chart below:

| Time | Transaction 1 | Transaction 2 | RecVersion of row r of table t in database. |
|---|---|---|---|
| T1 | Ttsbegin; Select forupdate; RecVersion in memory = v; | Ttsbegin; Select forupdate r1; Select forudpate r2; R1.RecVersion = v; R2.RecVersion = v; | V (commited) |
| T2 | Update; RecVersion in memory = v1; Commit; | | V1 (commited) |
| T3 | | Update r1 with relative mode; Update succeeds because RecVersion does not have to be checked; R1.RecVersion = v2; R2.RecVersion = v2; (this is updated so that you can make update through r2) | V2 (commited) |
| T4 | | Update r2 with absolute mode; Commit; Commit succeeds because the versions match; This may overwites changes made by transaction 1 at time T2 | V3 (commited) |

As illustrated above, a first data transaction may read the initial version identification value V and update the data item thereby causing the version identification value to be updated to V1. However, a second data transaction begins a write operation before the update, and performs two updates, with a first update being a relative update and a subsequent second update being an absolute update. The first update of the second data transaction does not check the version identification value V1 because the update is a relative update. Nonetheless, the first update provides new version identification value V2. The second update of the second data transaction gets the version identification value V2 during the read, uses the version identification value V2 upon update, updates the data item and successfully commits the data transaction because the version identification value V2 during the update matches the version identification value V2 initially read before the second update. As a result, the second data transaction may overwrite the changes made by the first data transaction.

In order to address this possibility, the new version identification is calculated as a relative version identification when the update is performed as relative update. In particular, the routine 700 computes the new value for the version identification as provided above at block 704. At block 706 the relative update routine 700 calculates the difference between the new version identification and the old version identification, and issues an update to set the version identification for the updated data item as the version identification value plus the difference, which may be expressed as "update . . . set RecVersion=RecVersion+delta" at block 708. The update is performed at block 710. Thus, for all references to the same row that were read inside the same transaction, the version identification is updated using the difference as well. If no other transactions update the row, the version identification value in the database matches the version identification value of all in memory references that were read in the same transaction with the same original version identification value, and future updates succeed on those rows. On the other hand, if the row was updated by some other transaction before the relative update is made, the version identifications would not match, and any future updates will cause an UpdateConflict exception.

Inter-Table Dependencies

In some cases, values of some columns within a table (e.g., table A) may be calculated based on upon values some columns of another table (e.g., table B). For example, an update to a data item within table A may initially read a value from table B, but prior to updating the data item within table A another user updates the value of table B. As result, the subsequent update to the data item within table A is based upon a stale value from table B.

In order to address such consistency values which are caused by inter-table dependencies, the kernel data access layer may supply a repeatable read hint for the application code. The repeatable read hint translates into a repeatable read lock hint, RepeatableRead, to the server system 202 which holds a shared lock on the fetched data until the data transaction ends. The repeatable read lock hint is applied only to the specific read statement and not to the entire data transaction. In the absence of a repeatable read lock hint, the shared lock is released right after the read operation. This may prevent other users from updating the row until the data transaction is committed. The shared locks are compatible with each other, such that multiple users running the same script are not blocked from each other.

Figure 9:
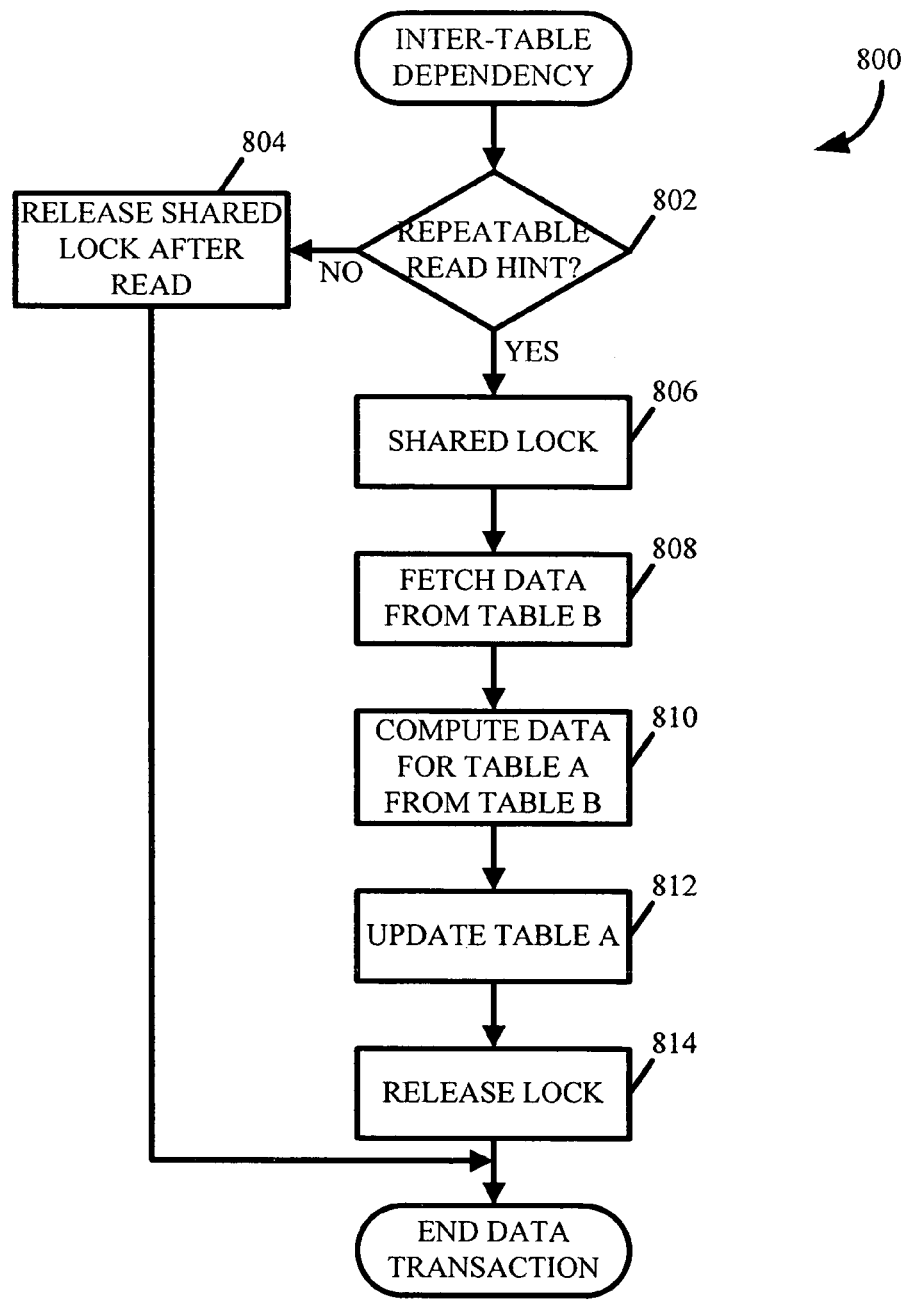
FIG. 9 is a flowchart representative of a routine for updating data dependent upon data in other tables.

FIG. 9 is an example of an inter-table dependency routine 800 which may be used to updated data item dependent upon a value from another table. At block 802, the routine 800 may receive a repeatable read hint from the application code which translates into the repeatable read lock hint to the server system 202. In the absence of a repeatable read hint, the shared lock is released immediately following the read operation at block 804 and the transaction is committed. If a repeatable read hint is provided, a shared locked on both table A and table B for the fetched data is provided at block 806 for the duration of the data transaction to prevent other users from updating the data item until the transaction is committed. The data item is fetched from table B at block 808. At block 810, the data item for table A is calculated based on the updated data item from table B and updated at block 812. At block 814, the shared lock is released and the data transaction is committed.

Although the forgoing text sets forth a detailed description of numerous different embodiments of the invention, it should be understood that the scope of the invention is defined by the words of the claims set forth at the end of this patent. The detailed description is to be construed as exemplary only and does not describe every possibly embodiment of the invention because describing every possible embodiment would be impractical, if not impossible. Numerous alternative embodiments could be implemented, using either current technology or technology developed after the filing date of this patent, which would still fall within the scope of the claims defining the invention.

Thus, many modifications and variations may be made in the techniques and structures described and illustrated herein without departing from the spirit and scope of the present invention. Accordingly, it should be understood that the methods and apparatus described herein are illustrative only and are not limiting upon the scope of the invention.

What is claimed is:

1. A method of concurrency control within an enterprise resource planning system comprising a database adapted to maintain data within a table having a plurality of rows, the method comprising:
    receiving a write request from a requesting application for updating data within a row of a first table during a first data transaction, wherein the row comprises a first version identification uniquely identifying a version of the data being updated and wherein the write request is maintained with a try block;
    comparing the first version identification of the data being updated with a second version identification uniquely identifying a version of the data within the row when the data was fetched in response to a previous read request during the first data transaction;
    throwing an exception within the try block indicating an update conflict if the first version identification does not match the second version identification, wherein the exception is caught within a catch block of the try block using a structured exception handling construct, wherein the first table is specified in the structured exception handling construct and wherein the catch block is executed only when the update conflict happens on the first table specified in the structured exception handling construct; and
    handling the exception within the first data transaction to attempt to compensate for the update conflict without automatically rolling back or aborting the data transaction if the table is enabled for optimistic concurrency control, wherein handling the exception comprises rereading and retrying the data transaction within the catch block of the try block.

2. The method of claim 1, further comprising:
    locking the data from a write request of a second data transaction to prevent the second data transaction from updating the data within the row if the first version identification matches the second version identification;
    updating the data within the row;
    releasing the lock on the data; and
    generating a third version identification which uniquely identifies a version of the updated data.

3. The method of claim 2, further comprising allowing a read of the data within the row of the first table in response to a read request from a requesting application during the second data transaction while the data is locked from a write request.

4. The method of claim 1, further comprising:
    fetching data in response to a read request from the requesting application for the data during the first data transaction;
    storing the first version identification which uniquely identifies the fetched data;
    allowing a second data transaction to update the data; and
    generating a second version identification which uniquely identifies the updated data of the second data transaction, wherein the updated data of the second data transaction comprises the data being updated during the first data transaction.

5. The method of claim 1, wherein throwing an exception comprises throwing the exception to application code of the requesting application.

6. The method of claim 1, wherein the write request is generated from an update statement of the requesting application enclosed within a first try block, and wherein handling the exception within the first data transaction comprises:
    catching the exception within a catch block of the try block;
    re-reading the second version identification from the row; and
    re-trying the comparison of the first version identification with the second version identification.

7. The method of claim 6, wherein the first try block is nested within a second try block, the method further comprising handling the exception within the first data transaction comprising:
    moving handling execution back to the second try block if re-trying the comparison of the first version identification with the second version identification within the catch block of the first try block results in an exception being thrown; and
    attempting to handle the exception within the second try block.

8. The method of claim 6, wherein handling the first data transaction comprises aborting the first data transaction if re-trying the comparison of the first version identification with the second version identification within the catch block of the first try block results in an exception being thrown and if the first try block is not nested within a second try block.

9. The method of claim 1, wherein the first data transaction is nested within a second data transaction, wherein handling the exception within the first data transaction comprises moving handling execution back to the second data transaction.

10. The method of claim 1, wherein the first version identification comprises one of the following: a random number based upon the data being updated or a random number based upon a first random seed, and wherein the second version identification number comprises one of the following: a random number based upon the data when the data was fetched in response to the previous read request during the first data transaction or a random number based upon a second random seed.

11. The method of claim 1, wherein data within a row of a second table is dependent upon the data being updated, the method further comprising:
- locking the data within the row of the first table from a write request of a second data transaction to prevent the second data transaction from updating the data within the row of the first table if data within a row of a second table data is calculated from the data within a row of the first table;
- locking the data within the row of the second table from a write request of a second data transaction to prevent the second data transaction from updating the data within the row of the second table;
- fetching the data within the row of the first table;
- updating the data within the row of the first table;
- determining the data within the row of the second table based at least in part on the updated data within the row of the first table;
- updating the data within the row of the second table;
- committing the first data transaction; and
- releasing the locks on the data within the rows of the first and second tables.

12. The method of claim 1, further comprising: updating the data without comparing the first and second version identifications if the write request comprises an update to provide a new value for the data within the row of the first table relatively dependent upon an existing value of the data within the row of the first table;
- generating a third version identification;
- determining the difference between the second version identification and the third version identification; and
- issuing an update to set a version identification which uniquely identifies a version of the updated data as the second version identification value plus the difference.

13. A computer-readable storage medium having computer-executable instructions stored on a computer storage medium for implementing a method of concurrency control between multiple data transactions on data within a first row of a first table, the computer executable instructions comprising instructions for:
- comparing a first version identification value and a second version identification, wherein the first version identification uniquely identifies a version of data from the first row during a read request of a first data transaction and, wherein the second version identification uniquely identifies a version of data from the first row during a write request of the first data transaction and wherein the write request is maintained with a try block of the first data transaction;
- throwing an exception within the try block indicating an update conflict if the first version identification does not match the second version identification, wherein the exception is caught within a catch block of the try block using a structured exception handling construct, wherein the first table is specified in the structured exception handling construct and wherein the catch block is executed only when the update conflict happens on the first table specified in the structured exception handling construct; and
- handling the exception within the first data transaction to attempt to compensate for the update conflict without automatically rolling back or aborting the data transaction if the first table is enabled for optimistic concurrency control, wherein handling the exception comprises rereading and retrying the data transaction within the catch block of the try block.

14. The computer-readable storage medium having computer-executable instructions of claim 13, wherein the write request is generated from an update statement of the requesting application, and wherein the update statement comprises an override of the optimistic concurrency control if the first table is enabled for optimistic concurrency control, the computer executable instructions further comprising instructions for locking the first row of the first table against any read requests of an write operation or write requests from a requesting application during a second data transaction, wherein the lock is held for the duration of the first data transaction.

15. The computer-readable storage medium having computer-executable instructions of claim 13, wherein the write request is generated from an update statement of the requesting application, and wherein the update statement comprises an update hint for enabling pessimistic locking, the computer executable instructions further comprising instructions for disabling the update hint for enabling pessimistic locking if the first table is enabled for optimistic concurrency control.

16. The computer-readable storage medium having computer-executable instructions of claim 13, further comprising executing a pessimistic locking of the data item for the duration of the data transaction if the first table is not enabled for optimistic concurrency control, wherein the pessimistic locking comprises:
- locking the first row against any read requests and write requests from a requesting application during a second data transaction; and
- updating the first row without comparing the first version identification to the second version identification.

17. The computer-readable storage medium having computer-executable instructions of claim 13, wherein the write request is generated from an update statement of the requesting application enclosed within a first try block, and wherein handling the exception within the first data transaction comprises:
- catching the exception within a catch block of the try block;
- re-reading the second version identification from the row; and
- re-trying the comparison of the first version identification with the second version identification.

18. A computer adapted for participation in an enterprise resource planning network, the computer comprising:
- a network communication device for receiving data via a network;
- a memory storing machine-readable instructions; and
- a processor for executing the machine-readable instructions performing a method comprising:
- receiving a read request from a requesting application for reading a first row of a first table stored within a database during a first data transaction;
- storing a first version identification which uniquely identifies a version of data read from the first row;
- receiving a write request from the requesting application for updating the first row during the first data transaction, wherein the write request is maintained with a try block of the first data transaction;

comparing the first version identification with a second version identification which uniquely identifies a version of data from the first row when the write request is received;

throwing an exception within the try block to the requesting application indicating an update conflict if the first version identification does not match the second version identification, wherein the exception is caught within a catch block of the try block using a structured exception handling construct, wherein the first table is specified in the structured exception handling construct and wherein the catch block is executed only when the update conflict happens on the first table specified in the structured exception handling construct; and handling the exception within the first data transaction to attempt to compensate for the update conflict without automatically rolling back or aborting the data transaction if the table is enabled for optimistic concurrency control, wherein handling the exception comprises rereading and retrying the data transaction within the catch block of the try block.

19. The computer of claim 18, wherein the instructions for handling the exception within the first data transaction comprise instructions for:
re-reading the second version identification from the row; and
re-trying the comparison of the first version identification with the second version identification.

20. The computer of claim 18, wherein the write request is generated from an update statement of the requesting application enclosed within a first try block, and wherein the instructions for handling the exception within the first data transaction comprise instructions for:
moving handling execution back to a second try block and handling the exception within the second try block if the first try block is nested within the second try block and if handling the exception within the first try block results in an exception being thrown; and
aborting the first data transaction the first try block is not nested within a second try block and if handling the exception within the first try block results in an exception being thrown.

* * * * *